United States Patent
van Kesteren et al.

(10) Patent No.: US 12,453,488 B2
(45) Date of Patent: Oct. 28, 2025

(54) PATCH CABLE, A BREATHING ADAPTER, AND A RESPIRATORY GAS DETECTION SYSTEM FOR DETECTING A CONCENTRATION OF A RESPIRATORY GAS

(71) Applicant: KONINKLIJKE PHILIPS N.V., Eindhoven (NL)

(72) Inventors: Hans Willem van Kesteren, Eindhoven (NL); Nicolaas Lambert, Eindhoven (NL); Petrus Theodorus Jutte, Eindhoven (NL); Adrianus Wilhelmus Dionisius Maria van den Bijgaart, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 798 days.

(21) Appl. No.: 17/787,961

(22) PCT Filed: Dec. 22, 2020

(86) PCT No.: PCT/EP2020/087583
§ 371 (c)(1),
(2) Date: Jun. 22, 2022

(87) PCT Pub. No.: WO2021/130202
PCT Pub. Date: Jul. 1, 2021

(65) Prior Publication Data
US 2023/0035923 A1    Feb. 2, 2023

(30) Foreign Application Priority Data

Dec. 23, 2019  (EP) ..................................... 19219189
Mar. 31, 2020  (EP) ..................................... 20167148

(51) Int. Cl.
*A61B 5/08*   (2006.01)
*A61B 5/00*   (2006.01)
*A61B 5/097*  (2006.01)

(52) U.S. Cl.
CPC ............ *A61B 5/082* (2013.01); *A61B 5/0075* (2013.01); *A61B 5/097* (2013.01)

(58) Field of Classification Search
None
See application file for complete search history.

(56) References Cited

U.S. PATENT DOCUMENTS

| 5,676,154 A | 10/1997 | Pettersson |
| 5,931,161 A | 8/1999 | Keilbach |

(Continued)

FOREIGN PATENT DOCUMENTS

| JP | 2012108095 A | 6/2012 |
| WO | 2010058150 A1 | 5/2010 |

(Continued)

OTHER PUBLICATIONS

Jaffe, M.B., "Infrared Measurement of Carbon Dioxide in the Human Breath: "Breathe-Through" Devices from Tyndall to the Present Day". Technology, Computing and Simulation, vol. 107, No. 3, Sep. 2008.

(Continued)

*Primary Examiner* — Jay B Shah

(57) ABSTRACT

The invention refers to a patch cable for connecting a respiratory module (103) to a breathing adapter (101) being, e.g., part of a capnography system. The patch cable (110) comprises a) a module connector (113), b) an adapter connector (114) comprising a light detector, c) a light guide, and d) an electric cable for directing an electric detection signal generated by the light detector from the adapter connector to the module connector. The adapter connector is (Continued)

configured such that an end of the light guide is positioned to provide the light into a gas cavity of the breathing adapter. The adapter connector is adapted such that the light detector detects light provided by the end of the light guide that has interacted with the gas provided in the gas cavity, when the adapter connector is connected to the breathing adapter. This, allows to improve the accuracy of respiratory gas detection.

14 Claims, 11 Drawing Sheets

(56) References Cited

U.S. PATENT DOCUMENTS

| | | | |
|---|---|---|---|
| 7,445,602 | B2 | 11/2008 | Yamamori |
| 2011/0066061 | A1 | 3/2011 | Colman |
| 2012/0272963 | A1 | 11/2012 | Thomas |
| 2014/0183380 | A1 | 7/2014 | Ukon |
| 2018/0177463 | A1 | 6/2018 | Addison |
| 2019/0099082 | A1 | 4/2019 | Jutte |
| 2019/0200899 | A1 | 7/2019 | Yoshida |

FOREIGN PATENT DOCUMENTS

| | | |
|---|---|---|
| WO | 2015104531 A1 | 7/2015 |
| WO | 2017162804 A1 | 9/2017 |

OTHER PUBLICATIONS

Respironics—White Paper. 21st Century CO2 Technology Sidestream Monitoring—The LoFlo System.

International Search Report for PCT/EP2020/087583 filed Dec. 22, 2020.

PATCH CABLE, A BREATHING ADAPTER, AND A RESPIRATORY GAS DETECTION SYSTEM FOR DETECTING A CONCENTRATION OF A RESPIRATORY GAS

CROSS-REFERENCE TO PRIOR APPLICATIONS

This application claims the priority benefit under 35 U.S.C. § 371 of International Patent Application No. PCT/EP2020/087583, filed on Dec. 22, 2022, which claims the priority benefit of European Patent Application No. 20167148.4, filed on Mar. 31, 2020 and European Patent Application No. 19219189.8, filed on Dec. 23, 2019, the contents of which are herein incorporated by reference.

FIELD OF THE INVENTION

The invention relates to a patch cable, a breathing adapter, a respiratory module and a respiratory gas detection system that are usable in the field of respiratory gas detection.

BACKGROUND OF THE INVENTION

For detecting respiratory gases in the breath of a patient generally the absorption of light of a specific wavelength range by the respiratory gas that should be detected is used. For this approach a light source, in most cases, a thermal mid-infrared source, has to be provided and the absorption of the light at a specific wavelength range by the respiratory gas has to be detected to determine the concentration of the respective respiratory gas in the breath of the patient. One example of such an application is capnography, in which the carbon dioxide $CO_2$ concentration in the breath of a patient is detected. In many approaches the exhalation gases of the patient are pumped via a cannula and sampling tube to a monitoring module comprising the necessary technology, in particular, the mid-infrared source, spectral filters, photodetectors and the detection electronics, for detecting the respiratory gas. In such an approach, the pump consumes a significant amount of power and thus inhibits the development of a battery powered small mobile device for breathing gas detection. Furthermore, the sidestream sampling tube leads to a signal delay and distortion by the gas transport and is prone to blockage by respiratory secretions and humidity.

In another approach, a near-infrared diode laser source and optical fibers are used to guide the provided light from the laser in the monitoring module to a breathing adapter, for instance, an oral-nasal cannula, and to guide the none-absorbed light from the breathing adapter to the monitoring module. In this case, the pump can be omitted, since the gas does not have to be transported from the airways of the patient to the detector device. In this approach, the use of tunable diode laser absorption spectroscopy (TDLAS) and of a vertical cavity surface emitting laser (VCSEL) as light source provided in the monitoring module allow the construction of a small and low power monitoring module. Such a capnography module can be battery powered and carried by the patient to allow the reduction of cables attached to the patient. Alternatively, the electronics for the respiratory gas detection can be integrated into a small, portable vital signs patient monitor. The general concepts of such an approach have been described, for instance, in US 2011/0066061 A1, WO 2015/104531 A1 and WO 2017/162804 A1.

However, also this approach provides some challenges. For instance, in capnography often a tunable near-infrared diode laser is used to detect $CO_2$ based on the optical light absorption of the provided laser light, since in the near-infrared range, fiber and semiconductor laser technology is well developed. However, the absorption of $CO_2$ is much smaller in the near-infrared than, for instance, in the mid-infrared wavelength range. Moreover, approaches using optical fibers often suffer from a signal quality degradation by interference effects resulting from reflections on surfaces of optical components in the light path or from internal interference in multi-mode fibers. These quality degrading effects are also called spectral background and can influence the accuracy of the concentration detection of the respiratory gas. Another major issue is that in order to obtain proper and stable $CO_2$ signals without distortion, single mode fibers are needed as light guide from laser to $CO_2$ detection cavity as well as from the $CO_2$ detection cavity to the remote detector. This results in positioning and alignment tolerances in the order of 1 micrometer. This will decrease the robustness and reliability of the device and will increase the manufacturing cost. Thus, it would be advantageous to provide a respiratory detection approach that allows to improve the accuracy, the robustness and reliability of the respiratory gas concentration detection and at the same time keeps the advantage of the possibility to provide a small device for detecting the respiratory gases.

SUMMARY OF THE INVENTION

It is an object of the present invention to provide a patch cable, a breathing adapter, a respiratory module and a respiratory gas detection system that allow to improve the detection of respiratory gases in the breath of a patient while at the same time allowing to provide a lightweight and small size respiratory gas detection system.

In a first aspect of the invention, a patch cable for connecting a respiratory module to a breathing adapter is presented, wherein the breathing adapter comprises a gas cavity, and wherein the breathing adapter and the gas cavity are adapted such that respiratory gas from a patient can enter the gas cavity when the breathing adapter is placed in functional contact with the mouth and/or nose of the patient, wherein the respiratory module is adapted to process data indicative for a concentration of a respiratory gas based on a signal provided through the patch cable, wherein the patch cable comprises a) a module connector configured to connect a first end of the patch cable to the respiratory module, b) an adapter connector configured to connect a second end of the patch cable to the breathing adapter, wherein the adapter connector comprises a light detector, c) a light guide configured to guide light from the module connector to the adapter connector, wherein the adapter connector is configured such that an end of the light guide is positioned to provide the light into the cavity of the breathing adapter, when the adapter connector is connected to the breathing adapter, and d) an electric cable configured to direct an electric detection signal generated by the light detector from the adapter connector to the module connector, wherein the adapter connector is adapted such that the light detector detects light provided by the end of the light guide that has interacted with the gas provided in the gas cavity, when the adapter connector is connected to the breathing adapter, such that the detection signal generated by the light detector is indicative of the concentration of a respiratory gas provided in the gas cavity.

Since the patch cable comprises not only a light guide for guiding light from the module connector to the adapter connector but also an electric cable for directing an electric detection signal generated by a light detector placed at the adapter connector to the module connector, wherein the adapter connector is adapted such that the light detector detects light provided by the end of the light guide that has interacted with the gas provided in the gas cavity such that the detection signal generated by the light detector is indicative of the concentration of a respiratory gas provided in the gas cavity, the respiratory gas can be detected locally, i.e. directly at the airways of the patient. Thus, there is no signal delay, no capnogram distortion due to gas transport and no issues with clocking in the sidestream tube. Moreover, since the light detector is incorporated in the adapter connector and the light can be focused on the light detector instead of into a light guide a much larger tolerance to deviations in the optical alignment can be achieved, because the detector area is larger than a cross section of the core of a fiber. This allows to improve the accuracy of the respiratory gas detection and at the same time allows to develop a robust system and small and lightweight respiratory modules for the detection of a respiratory gas.

The patch cable generally provides a connection between a respiratory module and a breathing adapter of a respiratory gas detection system. The patch cable can be provided as one cable, but might also be provided as a plurality of cables, i.e. a patch cable set, wherein each of the plurality of cables is attached to an adapter connector and a module connector. For instance, the patch cable can comprise one cable comprising the light guide and one cable comprising the electric cable, wherein both cables are attached to the same breathing adapter, but to different module connectors. Moreover, the patch cable can also comprise a splitting part in which the patch cable is split into two or more branches, i.e. cables. For instance, the patch cable can comprise one branch comprising the light guide and one branch comprising the electric cable. Thus, the patch cable can also be regarded as a patch cable set providing one or more cable branches that together form the patch cable.

The breathing adapter can be provided in a plurality of different forms and generally is configured to take up the breathing gas, i.e. respiratory gas of the patient's airways, such that the respiratory gas can enter a gas cavity provided in the breathing adapter. In this context, being in functional contact with the mouth and/or nose of the patient refers to being brought into a position that allows at least a part of the exhaled breath and/or inhaled air of a patient to enter the gas cavity provided by the breathing adapter. The breathing adapter can be a nasal cannula sampling the respiration through the nose or an oral-nasal cannula for patients that breath sometimes through the nose and sometimes through the mouth. The breathing adapter can also be part of a ventilation circuit of a patient undergoing ventilation therapy. In that case the breathing adapter is an airway adapter and is provided as part of the ventilation tubes used in the ventilation therapy. Moreover, the breathing adapter is configured to be connected by the adapter connector of the patch cable to the respiratory module. Generally, a combination of a breathing adapter and a correspondingly adapted patch cable, as described in the following description, can be regarded as forming a respiratory gas detection signal providing unit that is adapted to provide a detection signal indicative of the concentration of the respiratory gas to the respiratory module.

The respiratory module comprises at least some circuitry that is adapted to process data that is indicative for a concentration of a respiratory gas. In one embodiment, a respiratory module is adapted to directly use a detection signal provided by the detector through the electric cable of the patch cable to determine the concentration of the respiratory gas in the breath of the patient. The respiratory module can be adapted to process data indicative of a concentration of one respiratory gas or of a plurality of selected respiratory gases based on the signal provided through the patch cables. Moreover, the respiratory gas module can be adapted to provide the results of the process to a user, for instance, via a small display or some other visible or audible output, for instance, an alarm that can be provided if a concentration threshold of one or more respiratory gases has been exceeded. Further, the respiratory module can be adapted to be connected, for instance, via a wireless connection to a vital signs patient monitor or to other monitoring modules monitoring the patient, like heart activity monitoring devices, blood pressure monitoring devices, etc.

Moreover, the respiratory module can be adapted to comprise a light source that provides the light that is guided by the light guide of the patch cable to the breathing adapter. However, in another embodiment, the light source can be integrated in the module connector and the respiratory module can be adapted to provide the power necessary for generating the light by the light source via a connection to the module connector. Since the respiratory module does not have to provide a pump or a light detector, the respiratory module can be small and lightweight such that it can be worn by a patient, for instance, by using suitable attachment means.

The patch cable comprises a module connector and an adapter connector. Preferably, the patch cable comprises one module connector and one adapter connector. However, the patch cable can also comprise more than one module connector and more than one adapter connector, for instance, when the patch cable refers to a patch cable set. Moreover, the module connector and the adapter connector can comprise a plurality of parts, wherein each part can be connected individually to the respiratory module and the breathing adapter, respectively. For instance, the adapter connector can comprise two parts, wherein one part is adapted to provide the light detector to the gas cavity and the other is adapted to provide the end of the light guide to the gas cavity, when both parts of the adapter connector are connected to the breathing adapter.

The module connector is adapted to connect the patch cable to the respiratory module. In particular, the module connector and the respiratory module each comprise a connecting part which is configured such that they can be connected to each other using, for instance, a plug and socket mechanism. Moreover, also the adapter connector comprises a connecting part that is adapted to be connected to a corresponding connecting part of the breathing adapter. In particular, the connecting part of the adapter connector and the breathing adapter are configured such that the light provided by the end of the light guide is provided to the gas cavity and light having passed the gas in the gas cavity can be detected by the light detector, when the adapter connector is connected to the breathing adapter. Preferably, the breathing adapter provides a connecting part in the form of an opening in a housing of the breathing adapter into which the cable connecting part of the adapter connector can be fitted such that the light provided by the end of the light guide can reach the gas cavity and the light from the gas cavity can reach the light detector. The opening can be separated from the gas cavity by a transparent window such that the light provided by the end of the light guide and the light detected by the light detector pass the transparent window.

The light guide of the patch cable is adapted to guide light from the module connector to the adapter connector. The light guide can refer to one optical fiber but can also refer to a plurality of optical fibers, for instance, wherein each of the plurality of optical fibers is configured to guide light of a different wavelength to the breathing adapter. These optical fibers can be chosen to be optimal for $CO_2$, $O_2$ or a volatile anesthetic agent detection. Preferably, the one or more optical fibers of the light guide are single mode optical fibers. Single mode optical fibers have the advantage that the spectral background in the optical fiber is negligible. In particular, it is preferred that the light guide comprises a single mode silicate fiber suitable for guiding light at a wavelength close to 2 μm corresponding to a $CO_2$ absorption wavelength. In another embodiment, the light guide can also comprise a multimodal optical fiber.

The electric cable of the patch cable is adapted to direct an electric detection signal generated by the light detector from the adapter connector to the module connector. The electric cable comprises one or more electric wires. For instance, the electric cable can comprise a wire that is adapted as signal line for directing the electric signal generated by the light detector from the adapter connector to the module connector and can additionally comprise an electric wire that is adapted as power line for providing electric power form the module connector to the light detector.

The light detector provided as part of the adapter connector is preferably a photo diode that is adapted to convert light falling on the surface of the photo diode into an electric signal. In particular, the photo diode can be configured such that it is especially suitable for converting light of a wavelength as provided by the light guide into an electric signal. Preferably, the light detector is an InGaAs detector adapted to detect light in the near-infrared spectrum.

In an embodiment, the adapter connector comprises a first connector part and a second connector part, wherein the first connector part comprises the light detector and the second connector part comprises the end of the light guide, wherein the first and the second connector part are adapted to connect the adapter connector to the breathing adapter such that light provided through the end of the light guide and having passed through the gas cavity of the breathing adapter is detected by the light detector when the adapter connector is connected to the breathing adapter.

The first connector part and the second connector part of the adapter connector can be provided, for instance, by splitting the patch cable at one point of the patch cable into a first cable part comprising the electric cable connected to the light detector and a second cable part comprising the light guide that provides the light to the end of the light guide. The splitting of the patch cable can be provided at any length of the patch cable, for instance, the patch cable can be directly provided as a patch cable set comprising the first cable part and the second cable part. The breathing adapter can be adapted such that the first connector part and the second connector part are provided at different sides of the gas cavity, for instance, by providing two different connecting parts at different sides of the gas cavity to which the first connector part and the second connector part can be connected, to connect the adapter connector to the breathing adapter. Alternatively, the breathing adapter can be adapted to provide the connector part at the same side of the gas cavity, wherein in this embodiment a reflector, like a mirror, is provided at the opposite side of the gas cavity such that the light provided by the end of the light guide in the second connector part can be detected by the light detector provided in the first connector part, when the adapter connector is connected to the breathing adapter.

In an embodiment, the adapter connector comprises a U-shape, wherein the end of the light guide is positioned on one side of the U-shaped adapter connector and the light detector is positioned at the other side of the U-shaped adapter connector such that light provided through the end of the light guide and having passed through the cavity of the breathing adapter is detected by the light detector when the adapter connector is connected to the breathing adapter. In particular, in this embodiment the end of the light guide is positioned in one side part of the U-shaped adapter connector and the light detector is positioned in the other side part of the U-shaped adapter connector such that the end of the light guide and the light detector face each other through the gas cavity, when the adapter connector is connected to the breathing adapter. In this embodiment the breathing adapter is adapted to provide a connecting part that is adapted to connect to the U-shaped adapter connector. For instance, the breathing adapter can comprise as connecting part a connector opening into which the two side parts of the U-shaped adapter connector can be fitted such that the light provided by the light guide is provided to the gas cavity and the light having passed the gas cavity can be detected by the light detector.

In an embodiment, the breathing adapter provides at least one reflector as part of the breathing adapter on a side of the gas cavity opposite to a connection side at which the adapter connector is connectable to the breathing adapter, and wherein the adapter connector is adapted such that the end of the light guide and the light detector face substantially in the same direction such that light provided by the end of the light guide into the gas cavity and reflected by the at least one reflector provided as part of the breathing adapter is detected by the light detector when the adapter connector is connected to the breathing adapter. In this embodiment the breathing adapter can be adapted to provide a connecting part, for instance, a connector opening, at one side of the breathing adapter into which the adapter connector can be fitted such that the end of the light guide can provide light into the gas cavity and the light detector can detect the light provided into the gas cavity. In particular, the breathing adapter can in this embodiment be provided with a reflector, like a mirror, positioned at the opposite side of the gas cavity such that the light provided by the end of the light guide is reflected by the reflector to fall on the light detector. The reflector can comprise a metal layer, preferably, an aluminum layer, or a dielectric multi-layer coating as reflective layer.

In an embodiment, the end of the light guide comprises a lens incorporated within the adapter connector. In a preferred embodiment, the lens is a gradient index lens (GRIN-lens). In another embodiment, the lens can be a plastic lens or a ball lens. The lens can be adapted to focus the light provided by the end of the light guide to a specific point, for instance, to focus the light on the light detector. Therefore, the characteristics of the lens can be determined by the dimensions and the configuration of the breathing adapter, in particular of the gas cavity provided by the breathing adapter. For example, the focal length of the lens can refer to the length of a light path followed by a light beam between the surface of the lens and the surface of the light detector through the gas cavity. Providing a lens in front of the end of the light guide, i.e. between the gas cavity and the end of the light guide, allows to focus the light on the detector surface. The diameter of the focused spot can be much smaller than the detector diameter. When the spot is decentered with respect to the detector due to positioning tolerances, the light can still be detected if the detector surface is large enough. This will result in increasing the positioning and alignment tolerances.

In an embodiment, the light detector is connected to an Integrated Circuit (IC) incorporated within the adapter connector. Preferably, the IC is an amplification IC that amplifies the detection signal of the light detector such that the electronic signal from the light detector to the respiratory module becomes less sensitive to disturbances.

In an embodiment, the adapter connector is configured such that a surface of the light detector, at which the light is detected, is positioned comprising an angle with respect to a beam direction of the light detected by the light detector. Generally, the beam direction of the light detected by the light detector can be defined as an average beam direction referring to a spatial average of all light beams provided by the end of the light guide and falling on the light detector. Further, the beam direction can be defined by a central light beam provided at the center of the light guide and following a path through the gas cavity according to the optical arrangement of the breathing adapter and the adapter connector. Moreover, the angle between a surface and a line, for instance, the beam direction, can be defined as the angle between the line and a normal of the surface. Since the light detector is positioned such that it comprises an angle with respect to the beam direction of the light detected by the light detector, light reflected by a detector surface cannot again become part of the light beam falling on the detector surface. Thus, the contribution of light reflected at the surface of the detector to the spectral background can be reduced. Preferably, the angle of the detector surface with respect to the beam direction lies between 3° and 20°.

In an embodiment, the surface at the end of the light guide is configured to provide an angle with respect to a beam direction of the light provided by the end of the light guide into the gas cavity, when the adapter connector is connected to the breathing adapter. In particular, the surface at the end of the light guide provides an angle also with respect to the side walls of the light guide. Moreover, if the breathing adapter provides at least one reflector as part of the gas cavity on a side of the gas cavity opposite to a side at which the end of the light guide provides its light into the gas cavity, the surface at the end of the light guide can provide an angle also with respect to the reflective surface of the gas cavity. Moreover, if the end of the light guide comprises a lens, the surface of the lens facing the gas cavity when the adaptor connector is connected to the breathing adapter can be provided with the angle. In this case the angle can be defined with respect to the mid plane of the lens. Preferably, the angle of the surface at the end of the light guide with respect to the sides of the light guide lies between 2° and 20°, in particular, is 8°.

In an embodiment, the adapter connector further comprises a front part formed from a transparent material and being positioned between the end of the light guide and/or the light detector and the gas cavity when the adapter connector is connected to the breathing adapter. The front part formed from a transparent material, for instance, glass, can have the form of an angular or circular plate of transparent material comprising a predetermined thickness. In a preferred embodiment, the transparent front part positioned in front of the end of the light guide and/or in front of the light detector, i.e. between the end of the light guide and/or the light detector and the gas cavity, is an optical window that is tilted with respect to the beam direction of the light detected by the light detector and/or the light provided by the end of the light guide that passes the optical window. Preferably, the tilted angle lies between 3° and 20°, in particular, is 5°. In a further preferred embodiment a space formed between the front part and the light guide and/or the light detector is filled with an optical gel, for instance, an optical gel with a predetermined refractive index. The refractive index can be, for instance, 1.44 or another refractive index which is close to the refractive index of the optical window.

In an embodiment, the module connector further comprises i) a light providing unit being adapted to provide light through the light guide, and ii) a processing unit being adapted to receive the electrical detection signal provided by the light detector, wherein the processing unit is adapted to generate a data signal representing the respiratory gas concentration based on the electric detection signal. The light providing unit can be a laser light providing unit that is provided in the module connector. Preferably, the light providing unit is a VCSEL unit. The processing unit can be a dedicated circuit that is adapted to receive the electrical detection signal provided by the light detector and to generate a data signal by determining the respiratory gas concentration based on the electric detections signal. However, the processing unit can also refer to a software unit that is running on a general or dedicated processing device being part of the module connector.

Since the light providing unit and the processing unit are provided as part of the module connector of the patch cable, the respiratory module does not have to provide a respective light providing unit or respective processing unit and can be constructed to be even more lightweight. In this case, the respiratory module only has to provide the electricity to the module connector to power the light providing unit and the processing unit of the module connector such that also the connection part between the module connector and the respiratory module can be simplified to an electric connector and does not have to provide, for instance, a connector for the light guide. The respiratory module main function here is to provide the capnography data to the user and acquire input from the user on capnography settings. In this embodiment the patch cable can be regarded as a smart patch cable, wherein a smart patch cable is defined by providing additional functionality going beyond providing a simple connection between the respiratory module and the breathing adapter. In another embodiment, the module connector of the patch cable can comprise only one of the above units, i.e. can comprise only the light providing unit or only the processing unit.

In another aspect of the invention, a breathing adapter being adapted to be connected to the adapter connector of a patch cable, as described above, is presented, wherein the breathing adapter comprises a gas cavity, wherein the breathing adapter and the gas cavity are adapted such that respiratory gas from the patient can enter the gas cavity, when the breathing adapter is in functional contact with the patient, and wherein the breathing adapter is further adapted to connect to the adapter connector such that light provided by the end of the light guide can be detected by the light detector of the adapter connector after having passed the gas cavity for interacting with the respiratory gas provided in the gas cavity. For instance, the breathing adapter can provide a connector part, like a connector opening, to which a connector part of the adapter connector can be connected.

In an embodiment, the surfaces of the gas cavity comprise an angle with respect to a beam direction of a light beam provided through the end of the light guide when the adapter connector is connected to the breathing adapter. Preferably, the angle between the beam direction of the light beam provided through the end of the light guide and the surface of the gas cavity is greater than 3°, preferably, comprises an angle of 5°. Since the surface of the gas cavity comprises an angle with respect to the beam direction of a light beam provided through the end of light guide when the adapter connector is connected to the breathing adapter, light falling on the surfaces of the gas cavity will not be reflected back to the light guide or to the light detector, and thus will not contribute to the spectral background.

In an embodiment, the breathing adapter comprises at least one reflector being positioned such that the light provided by the end of the light guide is reflected by the at least one reflector such that it is detected by the light detector after the reflection at the at least one reflector when the adapter connector is connected to the breathing adapter. In particular, the position and configuration of the at least one reflector in the breathing adapter depends on the position and orientation of the end of the light guide and of the light detector when the adapter connector is connected to the breathing adapter. For instance, if the adapter connector is adapted, as already described above, such that the end of the light guide and the light detector are provided at the same side of the gas cavity when the adapter connector is connected to the breathing adapter, the at least one reflector can be provided at the opposite side of the gas cavity. Moreover, if the adapter connector is adapted, as also already described above, to provide the end of the light guide and the light detector at different sides of the gas cavity, when the adapter connector is connected to the breathing adapter, at least one reflector can be provided at each side of the gas cavity such that the light provided by the end of the light guide is reflected more than once before being detected by the light detector. Such an arrangement using more than one reflector can also be used in an embodiment in which the end of the light guide and the light detector are provided at the same side of the gas cavity when the adapter connector is connected to the breathing adapter, wherein in this case the light is reflected at least three times after having been provided by the end of the light guide and before being detected by the light detector.

In an embodiment, the reflector can be tilted with respect to a beam direction of the light when provided by the light guide into the gas cavity. In particular, the reflector can be tilted to reflect the light to the light detector. The tilt can then be predetermined based on the position of the end of the light guide and of the light detector when the adapter connector is connected to the breathing adapter.

In a preferred embodiment, at least one of the provided at least one reflector is a spherical reflector for focusing a light beam provided by the end of the light guide on the light detector when the adapter connector is connected to the breathing adapter. For instance, the spherical reflector can be a spherical mirror comprising a predetermined radius that can be determined based on the position and orientation of the end of the light guide and the light detector when the adapter connector is connected to the breathing adapter. The spherical reflector can focus the light on the detector surface. The diameter of the focused spot can be much smaller than the detector diameter. When the spot is decentered with respect to the detector due to positioning tolerances, the light can still be detected if the detector surface is large enough. This will result in increasing the positioning and alignment tolerances. Also in this embodiment the spherical reflector can be tilted with respect to the beam direction of the light provided by the light guide.

In another aspect of the invention, a respiratory gas detection signal providing unit is presented comprising a breathing adapter as described above and a patch cable as described above, wherein the breathing adapter and the patch cable are configured such that light provided by the end of the light guide provided by the adapter connector can be detected by the light detector provided by the adapter connector after having interacted with the gas in the gas cavity provided by the breathing adapter, when the adapter connector is connected to the breathing adapter.

In another aspect of the invention, a respiratory module being adapted to be connectable to a module connector provided by the patch cable, as described above, is presented, and to determine a concentration of a respiratory gas based on the signal provided by the patch cable, wherein the respiratory module comprises an output unit for outputting a determined concentration of a respiratory gas. The respiratory module can be adapted to determine the gas concentration based on the detection signal of the light detector, or if the module adapter of the patch cable comprises a processing unit based on the data signal provided by the processing unit being representative of the respiratory gas concentration. The output unit can be, for instance, a display for displaying the determined concentration of a respiratory gas. However, the output unit can also be adapted to provide another form of output, for instance, an audible or visible output, for example, provided by a loudspeaker or an LED, respectively, wherein the output is indicative of the determined concentration of a respiratory gas. In particular, an alarm can be provided by the output unit if a predetermined threshold of a concentration of the respiratory gas has been exceeded.

In an embodiment, the respiratory module further comprises i) a light providing unit being adapted to provide light through the module connector to the light guide of the patch cable when the patch cable is connected to the respiratory gas detection module, and ii) a processing unit being adapted to receive the electric detection signal provided by the light detector when the patch cable is connected to the respiratory gas detection module, wherein the processing unit is adapted to determine a respiratory gas concentration based on the electric detection signal. In this embodiment the patch cable does not refer to a smart patch cable, i.e. does not provide a light providing and/or gas concentration determination functionality by itself. In this case, it is preferred that the respiratory module provides a light providing unit and a processing unit for determining the gas concentration.

In an embodiment, the light providing unit is adapted to provide light with a wavelength substantially equivalent to an absorption wavelength of the respiratory gas for which the concentration should be determined. For instance, the light providing unit can be adapted to provide light in the near-infrared or the mid-infrared light spectrum referring to a wavelength that is known to be absorbed by $CO_2$ as respiratory gas.

In a preferred embodiment, the light providing unit is adapted to modulate the wavelength of the provided light around the absorption wavelength of the respiratory gas of which the concentration should be detected such that the detection signal provided by the light detector is also modulated, wherein the processing unit is adapted to determine the concentration of the respiratory gas based on a signal detected at the second harmonic of the modulation frequency.

In another aspect of the invention, a respiratory gas detection system is presented comprising a respiratory gas module as described above, a breathing adapter as described above, and a patch cable as described above connecting the respiratory gas module to the breathing adapter. In particular, the respiratory gas module, the breathing adapter and the patch cable are adapted such that the patch cable can be used for connecting the respiratory gas module to the breathing adapter, wherein the respiratory gas detection system is adapted to determine the concentration of a respiratory gas. The respiratory gas detection system can refer to any technically sensible combination of the above described embodiments of the respiratory gas module, the breathing adapter, and the patch cable.

It shall be understood that the patch cable, the breathing adapter and the respiratory module together form a respiratory gas detection system, wherein the configuration of one of the elements of the respiratory gas detection system can have an influence on the configuration of the others of the respiratory gas detection systems, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
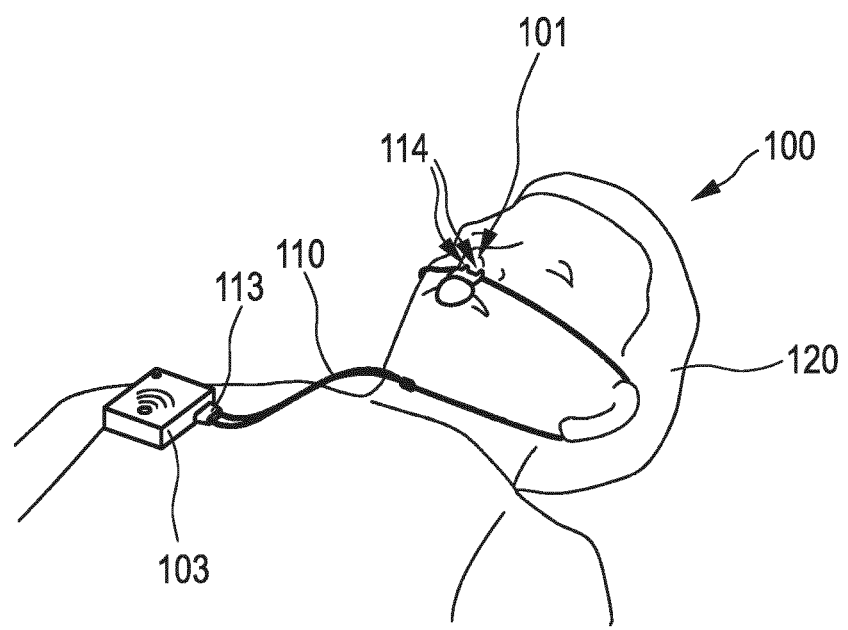
FIG. 1 shows schematically and exemplarily an embodiment of a respiratory gas detection system according to the invention.

FIG. 1 shows schematically and exemplarily an embodiment of a respiratory gas detection system according to the invention. In this exemplary embodiment the respiratory gas detection system is worn by a patient 120 and comprises a breathing adapter 101, a patch cable 110 and a respiratory gas module 103. In this exemplary embodiment of a respiratory gas detection system the respiratory module 103 can comprise a battery pack, a processing unit adapted for processing received electric detection signals indicative of a respiratory gas concentration, and a light providing unit for providing light in an absorption wavelength range of the respiratory gas that should be detected. Moreover, the respiratory module 103 can comprise a wireless connection unit that is adapted, for instance, to connect the respiratory module 103 to a patient monitor that can be used to show the results of the processing of the detection signal. Moreover, the respiratory module 103 is adapted to be connected to the patch cable 110. For instance, the respiratory module 103 can comprise a connecting part that is adapted to be connectable to a connecting part of the patch cable 110. In particular, in this embodiment the connecting part comprises an optical interface for providing an optical connection between the light providing unit and a light guide of the patch cable 110, wherein the optical interface is configured to couple light provided by the light providing unit into the light guide of the patch cable 110. Further, in this embodiment, the respiratory module 103 comprises an electric signal interface for providing an electrical connection between the processing unit and an electric cable of the patch cable 110 to pass electric detection signals from the patch cable 110 to the processing unit.

The breathing adapter 101 is adapted to be positioned in functional contact with the airways of the patient 120 and to provide a gas cavity through which the breath of the patient 120 can flow. The breathing adapter 101 has in the embodiment shown in FIG. 1 the form of a disposable cannula attached to the airways of the patient, in this case the nose and the mouth of the patient. Moreover, the breathing adapter 101 is adapted to be connected to an adapter connector 114 of the patch cable 110.

The patch cable 110 comprises a module connector 113 for connecting a first end of the patch cable 110 to the respiratory module 103. Further, the patch cable 110 comprises an adapter connector 114 for connecting a second end of the patch cable 110 to the breathing adapter 101. The adapter connector 114 further comprises a light detector for detecting light of a wavelength range provided by the light providing module and referring to the absorption wavelength range of the respiratory gas that should be detected. Further, the patch cable 110 comprises a light guide for guiding light from the module connector 113 to the adapter connector 114, and an electric cable for directing an electric detection signal generated by the light detector from the adapter connector 114 to the module connector 113. The adapter connector 114 and the breathing adapter 101 are adapted to each other such that light provided by the end of the light guide can pass the gas cavity of the breathing adapter 101 and can be detected by the light detector when the adapter connector 114 is connected to the breathing adapter 101. The breathing adapter 101 and the patch cable 110 can therefore be regarded as a gas detection signal providing unit for providing a gas detection signal to the respiratory module 103. Generally, the breathing adapter can be disposable after use with a patient. Preferably, the patch cable is cleanable, for instance, by wipe cleaning using a special disinfectant, and reusable for other patients. However, in other embodiments, also the breathing adapter might be cleanable and reusable. Moreover, in other embodiments the patch cable might be disposable after use with a patient.

In the embodiment shown in FIG. 1, the patch cable 110 comprises two cable parts that are both connected to one module connector. Moreover, the two cable parts can both be connected to the same adapter connector or the adapter connector can comprise a first and a second part, wherein each of the cable parts is connected via one of the adapter connector parts with the breathing adapter 101, respectively. In this embodiment the breathing adapter 101 can be an oral-nasal cannula with nasal prongs to sample the respiratory air through the nose and a mouth cap to sample the air inhaled and exhaled through the mouth. The two cable parts of this embodiment have the advantage that the cable parts can be split up, for instance, beneath the face of the patient as shown in FIG. 1, to bring the breathing adapter 101 into functional contact with the airways of the patient, i.e. to position the breathing adapter 101 in front of the nose and/or mouth of the patient. In this configuration, one of the cable parts can comprise the light guide for guiding light from the respiratory module 103 to the breathing adapter 101 and the other patch cable part can comprise the electric cable for directing an electric detection signal generated by the light detector to the respiratory module 103.

A schematic and exemplary overview of another embodiment of a respiratory gas detection system according to the invention is provided in FIG. 2 and will be described in the following. Patients with respiratory issues often need supplemental oxygen provided directly to the airways. Therefore, in this embodiment the respiratory gas detection system 200 comprises in addition to a breathing adapter 201, a patch cable 210 and a respiratory module 203 an oxygen supply comprising an oxygen supply tube 204 and an oxygen supply connector 206. The oxygen supply connector 206 is adapted to connect to an oxygen supply that is adapted to supply oxygen to a patient via the oxygen supply tube 204. To combine the oxygen supply with the breathing adapter 201 a flow path can be provided within or on top of the breathing adapter 201 to guide the supplemental oxygen to the airways of the patient, for instance, the nose of the patient. Preferably, the breathing adapter 201 is adapted such that the oxygen flow passes outside of the gas cavity that is provided in the breathing adapter 201 and used for detecting the concentration of a respiratory gas in the breath of the patient. This prevents that the oxygen supplied via the oxygen supply tube 204 is mixed with the exhaled air of the patient in the gas sensing cavity and thus has an influence on the respiratory gas detection.

Figure 2:
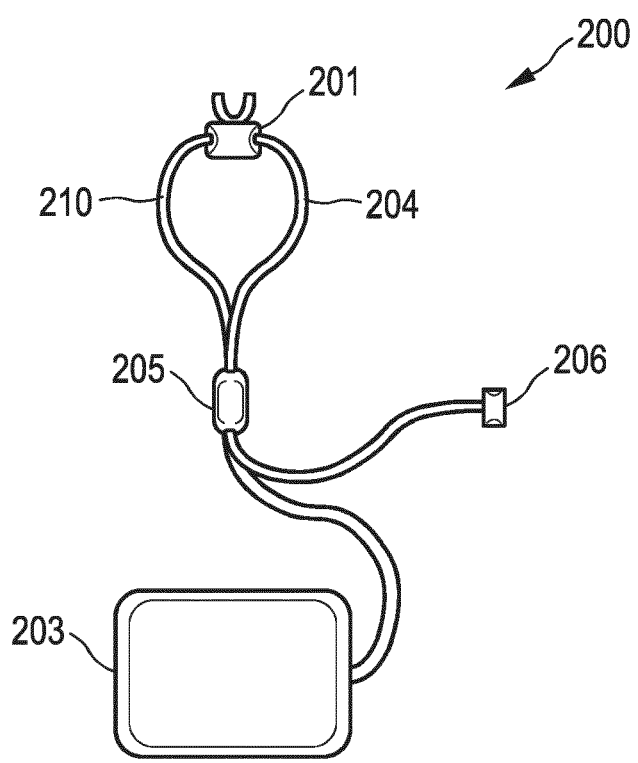
FIG. 2 shows schematically and exemplarily an embodiment of a respiratory gas detection system according to the invention.

In the exemplary embodiment shown in FIG. 2, the patch cable 210 is provided as only one patch cable in contrast to the patch cable 110 shown in FIG. 1. The patch cable 210 in this embodiment comprises thus an adapter connector not provided with two connector parts, wherein the adapter connector is not directly shown in FIG. 2. Instead, in this embodiment the adapter connector and the breathing adapter 201 are adapted such that the adapter connector of the patch cable 210 is connected to one side of the breathing adapter 201 so that the oxygen supply tube 204 can be connected to another side of the breathing adapter 201, preferably the opposite side of the breathing adapter 201.

Moreover, in this exemplary embodiment an adjustable slider 205 is provided around the patch cable 210 and the oxygen supply tube 204. The adjustable slider 205 can be used, for instance, to fix the oxygen supply tube 204 and the patch cable 210 to the patient, for instance, by guiding the patch cable 210 and the oxygen supply tube 204 behind the ears of a patient and by adjusting the adjustable slider 205 to fix the patch cable 210 and the oxygen supply tube 204 below the chin of the patient such that the position of the patch cable 210, the oxygen supply tube 204 and the breathing adapter 201 is fixed with respect to the head of the patient. Thus, the adjustable slider 205 in connection with the patch cable 210 and the supply tube 204 can be regarded as attachment means that allow to attach the breathing adapter 201 to the patient.

In the embodiment shown in FIG. 2 the breathing adapter 201 and the patch cable 210 are adapted such that the patch cable 210 is connected to the breathing adapter 201 only from one side of the breathing adapter 201. However, as will be shown in more detail in FIG. 3, the patch cable can also be adapted to comprise a first connector part 311 and a second connector part 312 as already indicated with respect to FIG. 1. In such an embodiment the breathing adapter 301 can be adapted such that the first connector part 311 and the second connector part 312 can be connected to a breathing adapter 301 on opposite sides of the breathing adapter 301, in particular, at opposite sides of the gas cavity provided in the breathing adapter 301. Part of the patient's nasal respiratory flow can pass through nasal prongs 313 and a gas cavity provided by the breathing adapter 301. If in such an embodiment an oxygen supply tube 204 is present, the oxygen supply tube 204 can be provided independently of the breathing adapter 301, i.e. without being connected to the breathing adapter 301. Alternatively, the breathing adapter 301 can provide an additional path for the oxygen supply to which the oxygen supply tube 204 can be connected. Preferably, the oxygen supply tube 204 is placed on top of the breathing adapter 301 and linked to separate nasal prongs 314. This embodiment allows to easily combine an oxygen supply tube, for instance, with the embodiment of the respiratory gas detection system 100 as shown in FIG. 1.

Figure 3:
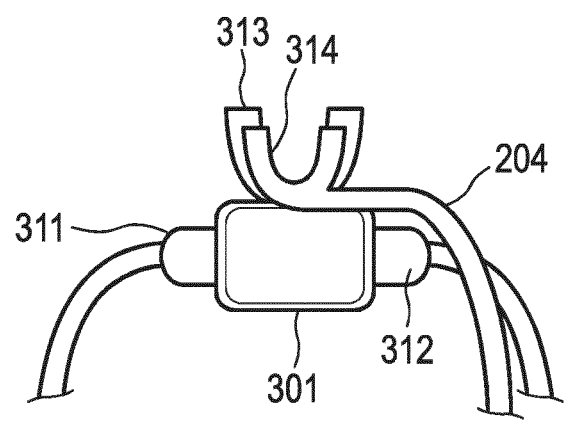
FIG. 3 shows schematically and exemplarily an embodiment of a breathing adapter according to the invention.
Figure 4:
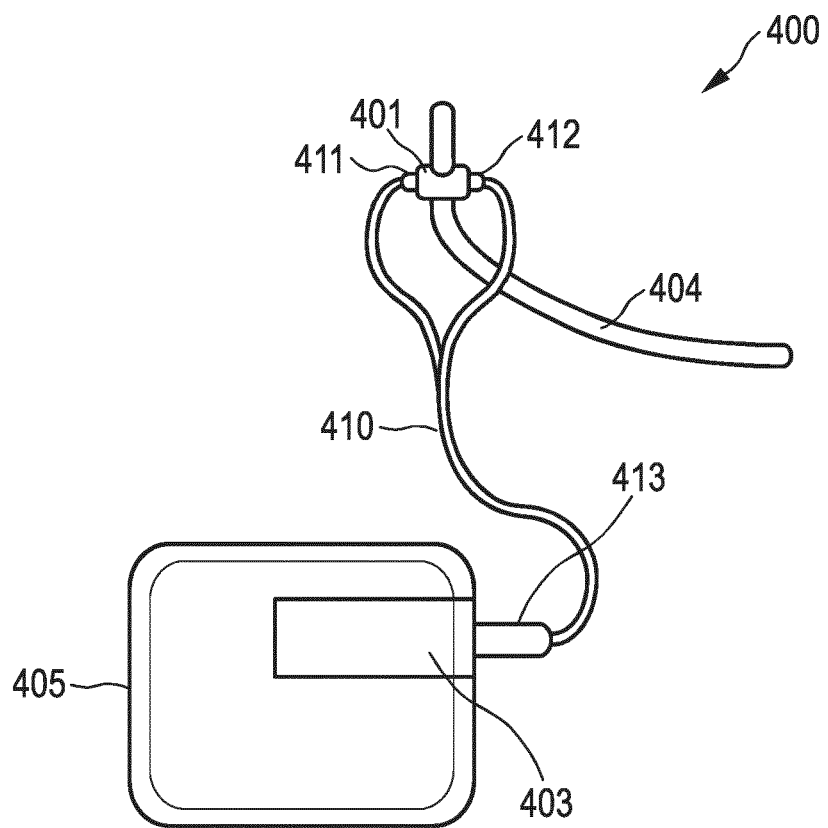
FIG. 4 shows schematically and exemplarily an embodiment of a respiratory gas detection system according to the invention.

FIG. 4 shows schematically and exemplarily another embodiment of the respiratory gas detection system. In this embodiment a respiratory gas detection system 400 is combined with a ventilation system for ventilating the lung of a patient. The respiratory gas detection system 400 in this case also comprises a breathing adapter 401, a patch cable 410 and a respiratory module 403. In the exemplary embodiment shown in FIG. 4, the breathing adapter 401 and the patch cable 410 provide a connection arrangement that is similar to the connection arrangement as shown in FIG. 3. In particular, the patch cable 410 shown in FIG. 4 is similar to the patch cable shown in FIG. 3 and comprising a first connector part 411 and a second connector part 412 that can be connected on opposite sides of the breathing adapter 401. However, in this embodiment, the breathing adapter 401 is configured to be integrated as an airway adapter into a ventilation system for ventilating the lung of the patient. For instance, the breathing adapter 401 can be configured to be placed between a first part of a ventilation tube 404 used for the intubation of the patient and a second part of the ventilation tube 404 that connects the ventilation tube 404 to the ventilation system or circuit. In one exemplary embodiment the breathing adapter 401 can be used as a connecting part between the first part of the ventilation tube 404 and the second part of the ventilation tube 404 such that gas provided for ventilation is passed through the breathing adapter 401, in particular, through the gas cavity provided by the airway adapter 401. However, in other embodiments the airway adapter 401 can be connected in other ways to the ventilation system of the patient such that breathing gas provided to or coming from the patient passes the gas cavity provided in the airway adapter 401. Generally, this modification of the breathing adapter, allowing the breathing adapter to become part of a ventilation system, can be combined with any of the exemplary configurations of the breathing adapter already described above or described in the following.

Moreover, in FIG. 4 an exemplary embodiment is shown in which the patch cable 410 is provided as a smart patch cable. In particular, the patch cable 410 comprises a module connector 413 which comprises a light providing unit and a processing unit. In particular, the light providing unit and the processing unit are integrated into the module connector 413. Since the light providing unit for providing light through the light guide of the patch cable 410 is part of the module connector 413, the module connector 413 only has to be adapted to provide electrical connections between the module connector 413 and the respiratory module 403. Interfaces for providing electrical connections are generally less prone to failure than, for instance, optical interfaces, and it is not necessary to provide a technically more complex optical interface between the module connector 413 and the respiratory module in this embodiment. Thus, in this example, the electrical power for the light providing unit and the processing unit in the module connector 413 is obtained through the connection of the module connector 413 with the respiratory module 403.

Preferably, in this embodiment, the processing unit is adapted to receive the electrical detection signals provided by the light detector and to generate a digital data signal based on the provided electrical detection signals, wherein the digital data signal represents a respiratory gas concentration. The module connector 413 can then be adapted to transfer not only the power for the light providing unit and the processing unit from the respiratory module 403 to the module connector 413, but also to transfer the digital data signal from the module connector 413 to the respiratory module 403. This allows to provide the respiratory module with a standardized connector that is adapted to receive the module connector, for instance, a connector part or interface of the module connector 413, but can also be adapted to receive the connector interfaces of other smart cables comprising other sensor types and providing a digital data signal representative of the measurements of these other sensor types.

The respiratory module 403 can further be adapted to recognize the digital data signal provided, for instance, by the processing unit of the module connector 413, and to identify a source of the digital data signal, for instance, to identify that the digital data signal is provided by a smart patch cable determining a respiratory gas concentration. The respiratory module 403 can then process the digital data signal, if necessary, based on the identification of the digital data signal to provide the results of the respiratory gas concentration detection, and/or the results of other measurements, to a patient monitor 405. The patient monitor 405 can be adapted to visualize the results of the respiratory gas concentration detection and/or of other measurements, for instance, on a display. Moreover, the patient monitor 405 can be adapted to analyze the result of the measurements or to combine the information from the measurements with other information, for instance, patient data provided by a hospital network or provided by other sources.

In the embodiment shown in FIG. 4, the respiratory module 403 is integrated into the patient monitor 405. However, in other embodiments, like, for instance, the embodiment shown in FIG. 1, the respiratory module can be a standalone system or can only be connected to a patient monitor, for instance, via a wireless connection. Generally, with respect to the above described embodiments, the different configurations of the breathing adapter, the patch cable and the respiratory module described with respect to FIGS. 1 to 4 can be easily combined. For instance, a smart patch cable, i.e. a patch cable comprising a module connector with integrated light providing unit and processing unit and respectively adapted respiratory module can also be used together with a breathing adapter as shown in FIG. 2 or 3.

In the following a more detailed description of different possible embodiments of a breathing adapter and a patch cable forming a respiratory gas detection signal providing unit, when the adapter connector is connected to the breathing adapter, will be provided with respect to FIGS. 5A to 5E, wherein all of these embodiments can be combined with any of the above described embodiments of a respiratory module. Generally, components that are the same with respect to one of the other embodiments shown in FIGS. 5A to 5E are provided with the same reference signs.

Figure 5A:
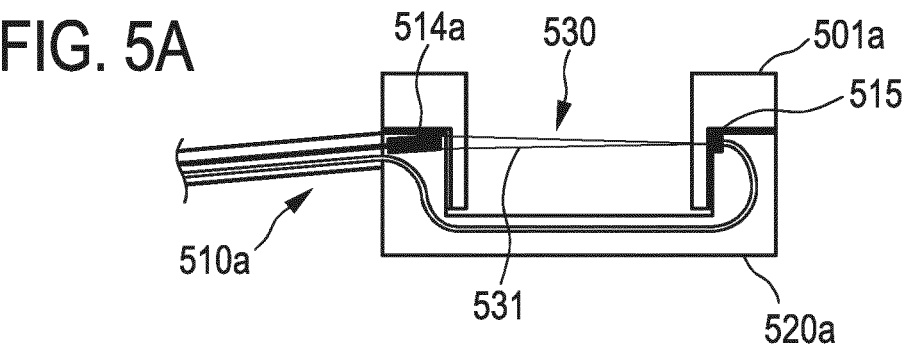
FIGS. 5A to 5E show schematically and exemplarily different embodiments of a breathing adapter and a patch cable according to the invention.

FIG. 5A shows a first exemplarily embodiment of a patch cable 510a comprising an adapter connector 520a. The adapter connector 520a is shown connected to a breathing adapter 501a comprising a gas cavity 530. Generally, the breathing adapter refers to the complete structure surrounding the gas cavity 530 as shown in FIGS. 5A to 5E. In this first embodiment the adapter connector 520a is U-shaped. The end of the light guide 514a is positioned at one side of the U-shaped adapter connector 520a and the light detector 515 is positioned on the opposite side of the U-shaped adapter connector 520a such that the light detector 515 and the end of the light guide 514a face each other. In particular, the end of the light guide 514a and the light detector 515 are positioned in such a way on opposite sides of the U-shaped adapter connector 520a that when the adapter connector 520a is connected with the breathing adapter 501a the light 531 provided by the end of the light guide 514a passes through the gas cavity 530 and falls on the light detector 515.

To improve the signal to noise ratio, in this embodiment the end of the light guide 514a can be provided with a GRIN-lens that focuses the light provided by the end of the light guide 514a onto the light detector 515, which can be, for instance, a photo diode. This embodiment has the advantage that the U-shape of the adapter connector 520a provides a rigid fixation of the relative positons of the end of light guide 514a and the light detector 515. Moreover, when the light 531 provided by the end of the light guide 514a is focused on the light detector 515, for instance, by the GRIN-lens, this allows to provide a very small light detector further allowing to decrease the costs for the patch cable and to decrease the size of the adaptor connector and thus also of the breathing adapter.

Further, it can be advantageous to provide the end of the light guide 514a, for instance, comprising a lens, for example, a GRIN-lens, such that it provides an angle with respect to beam direction of the light beam 531 provided by the end of the light guide 514a into the gas cavity 530. The lens focuses the light 531 on the detector surface. The beam direction of the light beam 531 can generally be defined by the direction of a central beam of the light beam 531 provided by the center of the light guide 514a. Such an angle prevents unwanted reflections of the provided light to couple back into the light guide 514a or to fall on the light detector, thus decreasing the spectral background caused by the light reflections on the surface of the end of the light guide 514a. Moreover, it can also be advantageous to provide the light detector 515, in particular, a surface of the light detector 515 facing the gas cavity 530, with an angle with respect to the beam direction of the light beam 531 detected by the light detector 515. Also this allows to reduce a spectral background caused, for instance, by reflections of light at the surface of the light detector 515 and/or at different surfaces that falls on the light detector 515.

Figure 5B:
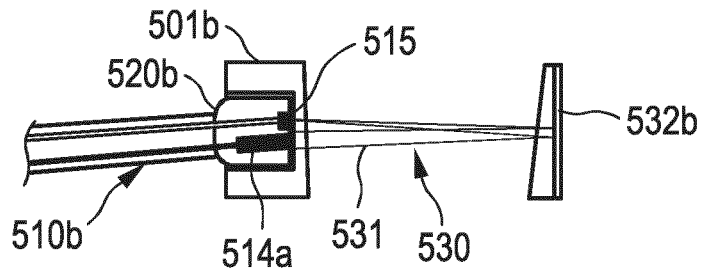

FIG. 5B shows another exemplary embodiment of a patch cable 510b connected via an adapter connector 520b to the breathing adapter 501b. The main difference to the embodiment described with respect to FIG. 5A is that in this embodiment the adaptor connector 520b and the breathing adapter 501b are adapted such that the adapter connector 520b is only connected to one side of the breathing adapter 501b. In particular, a connecting part, here a connecting opening, at which the adapter connector 520b can be connected to the breathing adapter 501b is only provided at one side of the gas cavity 530.

In this exemplary embodiment, the adapter connector 520b is configured such that the end of the light guide 514a, for instance, comprising a GRIN-lens, and the light detector 515 face substantially in the same direction. Further, in this embodiment, the breathing adapter 501b comprises a reflector 532b as part of the breathing adapter 501b on a side opposite of the adapter connector 520b, when the adapter connector 520b is connected to the breathing adapter 501b. Therefore, the light 531 provided by the end of the light guide 514a is reflected by the reflector 532b on the opposite side of the gas cavity 530 such that the light passes the gas cavity 530 twice before reaching the light detector 515. This allows to substantially double the light absorption during its passing through the gas cavity 530 that is filled with a breathing gas of the patient comprising a respiratory gas that can absorb at least parts of the light 531 provided by the end of the light guide 514a. This increased absorption allows, for instance, to increase a signal to noise ratio and thus to improve the detection sensitivity or reduce the length of the gas cavity 530 while keeping the detection sensitivity constant. Also in this exemplary embodiment the surface of the light detector 515 and the surface at the end of the light guide 514a can be provided with an angle with respect to the light beam 531 as described above with respect to FIG. 5A.

Figure 5C:
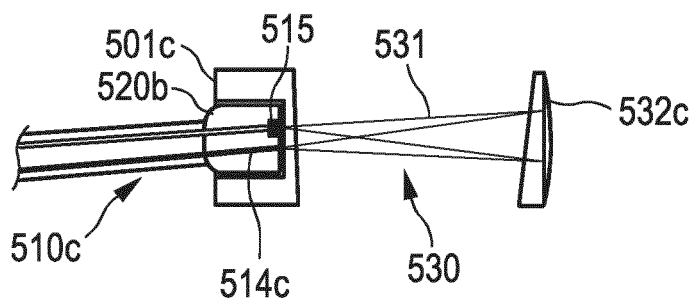

Another embodiment of a breathing adapter 501c that can be connected to the adapter connector 520b is shown in FIG. 5C. The main difference of the embodiment shown in FIG. 5C to the embodiment shown in FIG. 5A is that the reflector 532c of the breathing adapter 501c is provided as a spherical reflector. In this embodiment of the patch cable 510c, a lens, for instance, a GRIN-lens, at the end of the light guide 514c can be omitted while at the same time the spherical reflector 532c focuses the light provided by the end of the light guide 514c to the light detector 515. Thus, also if a divergent light beam 531 is provided by the end of the light guide 514c the light will be focused by the reflector 532c on the light detector 515. Preferably, also in this case the end of the light guide 514c is provided with an angle with respect to the direction of the light beam provided by the end of the light guide 514c to prevent back reflection interference that can contribute to the spectral background and instability of the diode-laser light source. Since in this embodiment the lens at the end of the light guide 514c is omitted, the dimensions of the adapter connector 520b can be reduced. Alternatively, the space occupied otherwise by the lens can be used to increase the size of the light detector 515 to make the system less prone to disturbances in the light path.

Figure 5D:
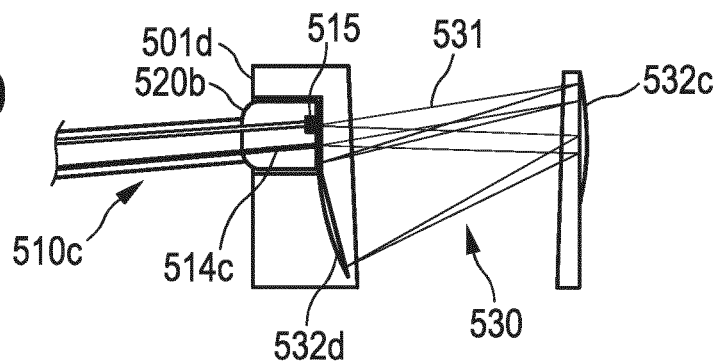

FIG. 5D shows another exemplary embodiment of a breathing adapter 501d to which the adapter connector 520b can be connected. In this embodiment, a second reflector 532d is provided as part of the breathing adapter 501d in addition to the first reflector 532c as already shown in FIG. 5C. Preferably, the second reflector 532d is also a spherical mirror. The first reflector 532c and the second reflector 532d are positioned in such a way at the breathing adapter 501d within the gas cavity 530 that light 531 provided by the end of the light guide 514c can pass four times through the gas cavity 530 before being focused on the light detector 515. Thus, in this embodiment the signal to noise ratio can be further increased or the size of the gas cavity 530, in particular, the length of the gas cavity 530 can be further decreased. Moreover, in other embodiments even more reflectors can be provided, for providing additional passes of the light through the gas cavity 530.

Figure 5E:
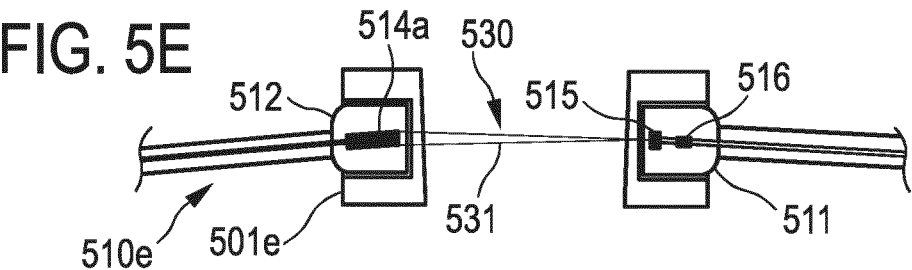

A further embodiment of a patch cable 510e and a breathing adapter 501e is shown in FIG. 5E. In this embodiment, the adapter connector of the patch cable 510e comprises a first connector part 511 and a second connector part 512, wherein the first connector part 511 comprises the light detector 515 and the second connector part 512 comprises the end of the light guide 514a. In this embodiment, the first connector part 511 and the second connector part 512 are adapted to be connected to the breathing adapter 501e on opposite sides of the gas cavity 530. In particular, the breathing adapter 501e is configured to provide two connecting parts, for instance, two connecting openings, on opposite sides of the breathing adapter 501e to which the first connector part 511 and the second connector part 512 can be connected, respectively. The breathing adapter 501e is in particular adapted to provide the connector parts such that when the first connector part 511 and the second connector part 512 are connected to the connector parts of the breathing adapter 501e the light provided by the end of the light guide 514a can fall on the light detector 515.

In this embodiment, the end of the light guide 514a can again be provided with a lens, for instance, a GRIN-lens. Moreover, also in this embodiment the surface of the light detector 515 and the surface of the end of the light guide 514a, for instance, the surface of the GRIN-lens, can be provided at an angle with respect to the beam direction of the light beam 531. Moreover, in this embodiment it is further shown that an IC 516 can be provided in the second connector part 512 and connected to the light detector 515. The IC 516 can be used to amplify the detection signal provided by the light detector 515 such that the signal transport becomes less sensitive to disturbances. The IC can also be provided in any of the other above described embodiments as part of the adapter connector and being connected to the light detector.

In all embodiments described above with respect to FIGS. 5A to 5E, the breathing adapter can be made of a plastic, for instance, a polycarbonate which has a limited absorption at a wavelength used for the detection of the respiratory gas. For instance, if the respiratory gas that should be detected is $CO_2$, the breathing adapter or at least the parts of the breathing adapter where the light passes should have a limited absorption for a wavelength used for $CO_2$ detection. The breathing adapter can be manufactured, for instance, using injection molding. However, other manufacturing methods can also be contemplated.

Preferably, in all of the above described embodiments, the surfaces of the gas cavity comprise an angle with respect to a beam direction of the light beam provided through the end of the light guide when the adapter connector is connected with the breathing adapter. This allows to further reduce the spectral background. Moreover, although not shown in FIGS. 5A to 5E, the breathing adapter of all embodiments allows the beam provided by the end of the light guide to pass into the gas cavity and from the gas cavity into the light detector substantially undisturbed by any component of the breathing adapter. For instance, the breathing adapter can be transparent for light at the preferred wavelength or can comprise a transparent window between the end of the light guide/the light detector and the gas cavity. Alternatively, the breathing adapter can provide an opening into the gas cavity that is closed by the adapter connector when the adapter connector is connected to the breathing adapter and through which the light can pass into the gas cavity and from the gas cavity to the light detector.

Further, in all of the above described embodiments, the adapter connector can comprise a front part formed from a transparent material being positioned in front of the end of the light guide and/or in front of the light detector, i.e. between the end of the light guide/the light detector and the gas cavity. This transparent front part can be used to disperse the light beam provided by the end of the light guide such that larger outgoing and returning light beam dimeters at the surface of the front part can be achieved making the light detection less prone to failure, for instance, caused by blocking of light by small dust particles.

In all of the above embodiments a lens can be provide at the end of the light guide, wherein the lens is preferably a GRIN-lens. However, the lens can also be a generally known spherical or aspherical plastic lens being part, for instance, of the adapter connector. Moreover, the plastic lens can also be provided as part of the breathing adapter, in particular, as part of an interface of the breathing adapter at which the adapter connector is connected. Additionally or alternatively, in all embodiments a lens can be provided in front of the light detector, for instance, a small plastic focusing lens. This allows to increase the effective size of the light detector. If the respiratory gas that should be detected is $CO_2$ and thus a light provided by the end of light guide lies in the near-infrared wavelength range, the light detector can be an InGaAs detector.

Figure 6:
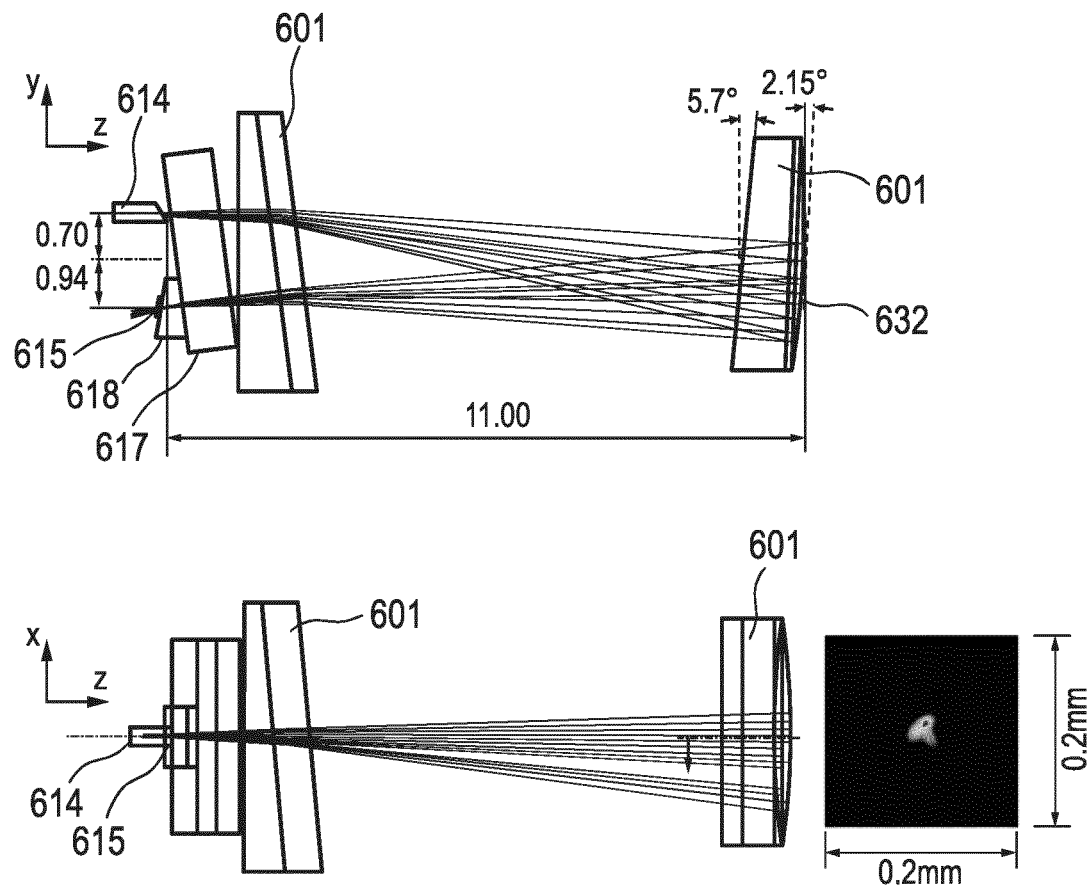
FIGS. 6 and 7 show simulated light paths in an exemplary embodiment of a breathing adapter connected to a patch cable according to the invention.
Figure 7:
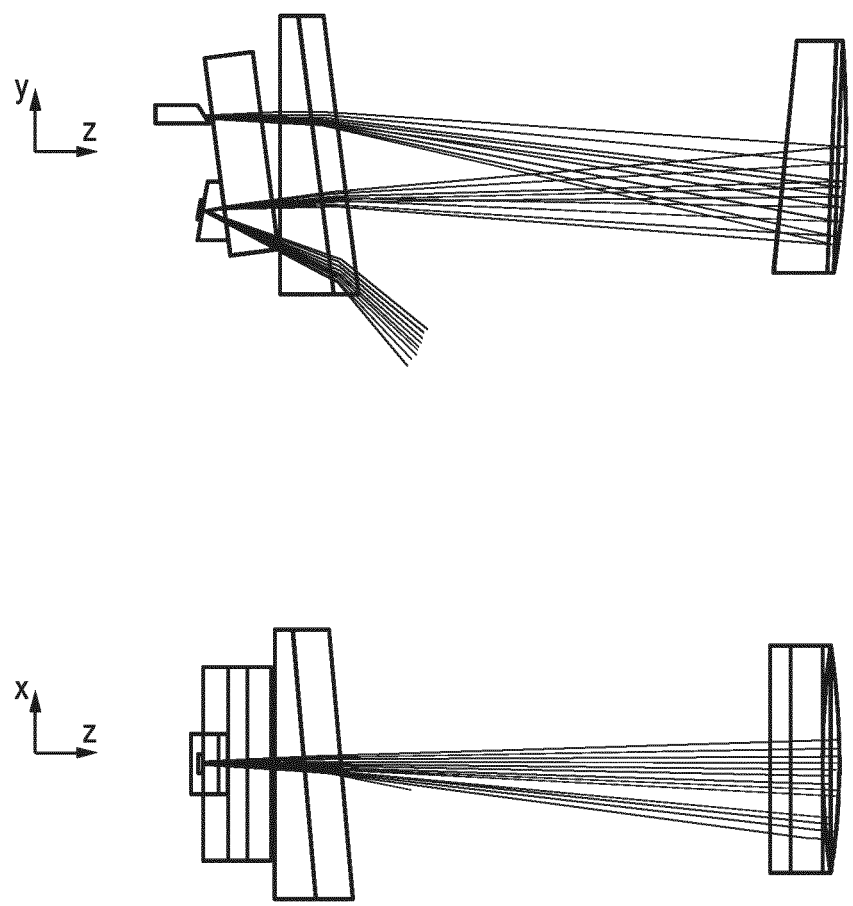

In the following, exemplarily a very detailed embodiment of an adapter connector and a breathing adapter corresponding to the embodiment described with respect to FIG. 5C will be described with respect to FIGS. 6 to 8. In particular, FIGS. 6 and 7 show simulations of the paths of light beams provided by the end of the light guide when the adapter connector is connected to the breathing adapter of this embodiment. The shown simulations are acquired by using an optical ray-tracing algorithm. The embodiments shown in FIGS. 6 and 7 show exemplarily the different measures that can be taken to avoid unwanted reflections in the gas cavity that can cause interference effects and contribute to the spectral background of the measured light signal. Moreover, some exemplary dimensions of the breathing adapter and the adapter connector are provided in FIGS. 6 to 8, wherein all length dimensions are provided in mm.

The first drawing in FIG. 6 shows an example of an embodiment of the breathing adapter as described with respect to FIG. 5C and the light paths that light provided by the end of the light guide will follow in such an embodiment. The upper part of FIG. 6 shows the schematics of a breathing adapter 601 in the y-z plane, whereas the bottom part of FIG. 6 shows the schematics of the breathing adapter 601 in the x-z plane. In this simulation, the near-infrared light beam was provided with a wavelength of 2000 nm and was simulated as being guided by a single mode fiber of the light guide 614 into the breathing adapter 601. The end of the optical fiber 614 is in this example provided with an angle with respect to the y-axis, and also with respect to the beam direction following the x-axis, of 8° to avoid back reflection of the beam into the fiber. Further, in this example, a front part in form of a glass window 617 at an angle with respect to the y-axis of 8° is provided through which the light beam is transmitted. For this simulation the glass has been chosen to be of the type BK7. Further, a light detector 615 is chosen as an InGaAs near-infrared light detector also configured to comprise an angle with respect to the y-axis of 8°. A space between the front part 617 and the detector 615 is, in this example, filled with an optical gel 618 comprising a refractive index of 1.44 to avoid reflections between the surfaces of the front part and the detector. The breathing adapter 601 is made, in this example, from injection molded polycarbonate.

The light beam provided at the end of the light guide 614 enters the breathing adapter 601 via a window in the surface of the breathing adapter 601, wherein the window comprises a wedge shape and a tilted surface in the gas cavity, comprising an angle of 7.5° with respect to the y-axis to avoid unwanted reflections that can result in interference effects. The beam is then reflected and focused on the detector by a spherical mirror 632 positioned in the gas cavity of the breathing adapter 601. In this example the radius of the spherical mirror is 16.0 mm. The reflective material of the mirror can be a metal layer, for instance, aluminum, or a dielectric multi-layer coating. The spherical mirror 632 is provided with an angle of 2.15° with respect to the y-axis. The polycarbonate surface of the breathing adapter 601 in front of the mirror is provided with an angle of 5.7° with respect to the y-axis. Further, the diameter of the detector is chosen to be 0.2 mm.

As can be seen in the simulated measurement at the right lower corner of FIG. 6, a light spot detected on the detector surface when light is provided by the end of the light guide is in this configuration much smaller than the diameter of the detector. The spot diameter is about 20 micrometer. The square detector has dimensions of 0.2×0.2 mm. This results in a position tolerance for the detector of up to 0.1 mm and thus allows an easy manufacturing of the adapter connector and the breathing adapter FIG. 7 shows the same exemplary configuration of the adapter connector and the breathing adapter as in FIG. 6, wherein in this simulation of the light paths a possible reflection of the light at a surface of the detector has been simulated. The upper part of FIG. 7 shows again the configuration of the breathing adapter in the y-z plane and the bottom part of FIG. 7 shows again the configuration of the breathing adapter in the x-z plane. As can be seen in this drawing, such a possible reflection will not fall on the light detector and thus will not contribute to the spectral background. In further simulations it can also be shown for this exemplary configuration that no light reflected unintentionally by any of the surfaces of the breathing adapter will reach the light detector. Thus, unwanted interference effects and spectral background can be largely reduced by this configuration.

Figure 8:
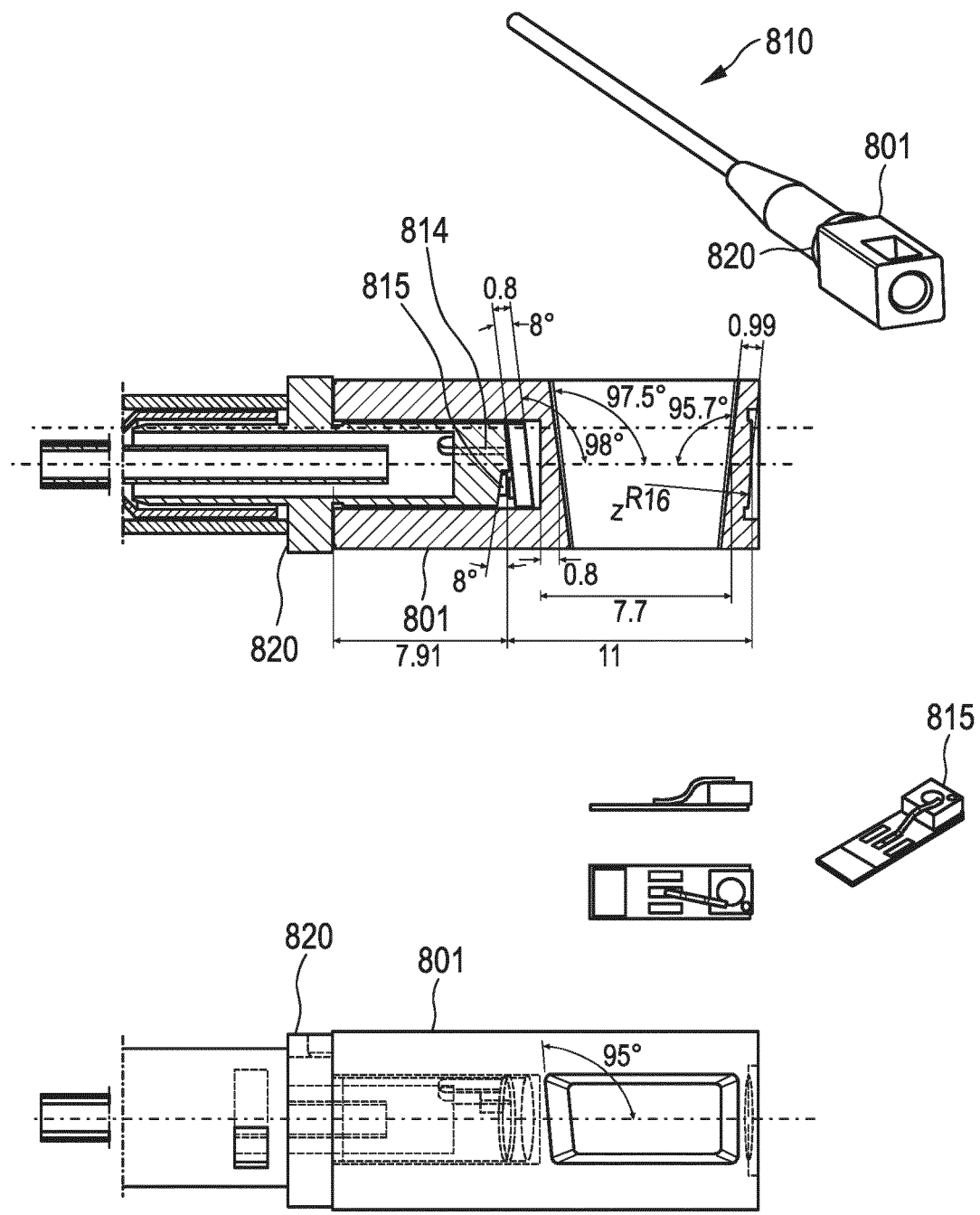
FIG. 8 shows schematically and exemplarily a detailed embodiments of a breathing adapter and a patch cable according to the invention.

FIG. 8 shows a more detailed exemplary embodiment of a breathing adapter and an adapter connector. In particular, FIG. 8 provides some exemplary dimensions of a breathing adapter and an adapter connector in accordance with the invention, wherein the length dimensions provided at the drawings are provided in mm. FIG. 8 shows exemplary dimensions for the breathing adapter 801 and the adapter connector 820, wherein the configuration in FIG. 8 corresponds to an embodiment as described with respect to FIG. 5C. Moreover, also some exemplary arrangements for the patch cable 810, the breathing adapter 801, the adapter connector 820, the light guide 814 and the detector 815 are shown on the left of FIG. 8. Generally, it has been found that a length of the gas cavity in the direction of the light beam provided by the end of the light guide of 7.7 mm in this configuration is advantageous. The breathing adapter 801 shown in FIG. 8 refers to an injection molded polycarbonate breathing adapter, wherein the breathing adapter 801 is designed as disposable product. The breathing adapter 801 as shown in FIG. 8 is adapted to be directly connected to the adapter connector 820 without providing further opto-electrical alignments. The light detector 815 in this embodiment refers to an InGaAs near infra-red detector. Due to the value of the light detector 815 the patch cable 810 can be configured as reusable product.

Generally, all of the measures for reducing the spectral background provided by the above described configurations, like the angle provided by the surfaces of the gas cavity, etc., can also be applied to any of the previously described embodiments of the breathing adapter and the adapter connector. Moreover, the provided dimensions are preferred dimensions of the embodiments shown in the above figure, however, also other dimensions can provide the same effects as described above.

Figure 9:
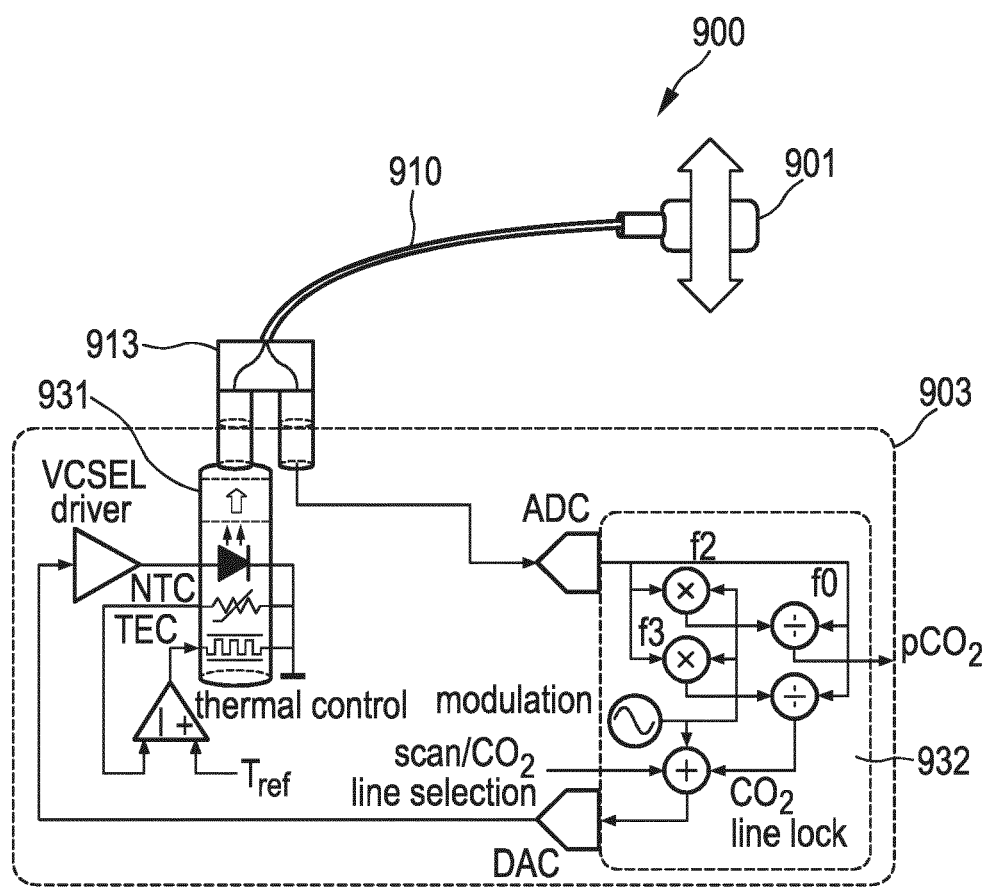
FIG. 9 shows schematically and exemplarily an embodiment of a respiratory module according to the invention.

In the following, an exemplarily embodiment of a respiratory module according to the invention will be described with respect to FIG. 9. In FIG. 9, a breathing adapter 901 through which breathing gases are guided and a patch cable 910 are schematically shown. The breathing adapter 901 and the patch cable 910 can refer to any of the embodiments that have been described above. The patch cable 910 is connected to the respiratory module 903 which in this case is shown as a capnography module via a module connector 913. The respiratory module 903 comprises, in this embodiment, a light providing unit 931 for providing light to the light guide of the patch cable 910. In this example, the light providing unit 931 refers to a VCSEL with a wavelength close to one of the $CO_2$ absorption lines around 2 μm. The light provided by the VCSEL is guided to a light guide of the patch cable 910 and then further via the light guide to the breathing adapter 901. Light that is not absorbed by the respiratory gases in the gas cavity of the breathing adapter 901 is detected by the light detector integrated with the patch cable 910. The detection signal is then provided from the light detector via an electrical cable of the patch cable 910 to the detection electronics 932, i.e. processing unit, of the respiratory module 903. Generally, in all embodiments, to improve the signal quality, the electric cable can be shielded or a pre-amplifier can be provided at or near the light detector.

Preferably, the wavelength provided by the VCSEL is modulated at several tens of kHz by modulating an injection current of the VCSEL. In this case an electrical signal is received that is proportional to the $CO_2$ concentration by a lock-in detection on the second harmonic f2 of the modulation frequency. An advantage of using a second harmonic of the modulation frequency for obtaining a signal proportional to the $CO_2$ concentration instead of a first harmonic is that the second harmonic is less sensitive to offsets of the electrical signal. To compensate for intensity drift of the VCSEL and varying optical losses in the path to and within the breathing adapter, the electrical signal can be normalized to the direct current f0 of the light detection signal. To stabilize the temperature of the VCSEL a thermal electric cooling (TEC) unit can be provided near the VCSEL, for instance, in the VCSEL housing. The temperature of the VCSEL determines the wavelength of the provided light in combination with the current provided to the VCSEL. For stabilizing the VCSEL to provide light around the desired absorption line of the respiratory gas, for instance, of $CO_2$, a control loop is provided using the third harmonic f3 signal as shown in the schematics of the electronics, i.e. the processing unit 932. The third harmonics f3 signal crosses zero at the center of the absorption line of the respiratory gas. The processing unit 932 and the respiratory module 903 shown in FIG. 9 show an exemplary electrical processing scheme for this signal processing. However, also other electrical processing schemes can be used or the processing unit 931 can refer to a general electronic processing unit like a computing unit comprising software that a allows the processing of the above described signal processing. Moreover, also other signal processing schemes can be used for determining the gas concentration form the electric signal provided by the light detector. For instance, alternatively to lock-in detection on the zero crossing of the third harmonic signal f3 and the peak detection of the second harmonic f2 to determine the concentration of the respiratory gas, the wavelength of the light provided by the VCSEL can be continuously swapped through a wavelength corresponding to the absorption line and then can be fitted to stored reference line shapes. The peak intensity of the resulting signal can then be derived and the center of the wavelength sweep can be determined and, if necessary, corrected based on a subsequent sweep.

Preferably, the VCSEL light passes through an isolator within the optical interface at which the respiratory module 903 and the module connector 913 are connected. This prevents a feedback of the light into the VCSEL resulting in laser noise and spectral background from the VCSEL unit.

Figure 10A:
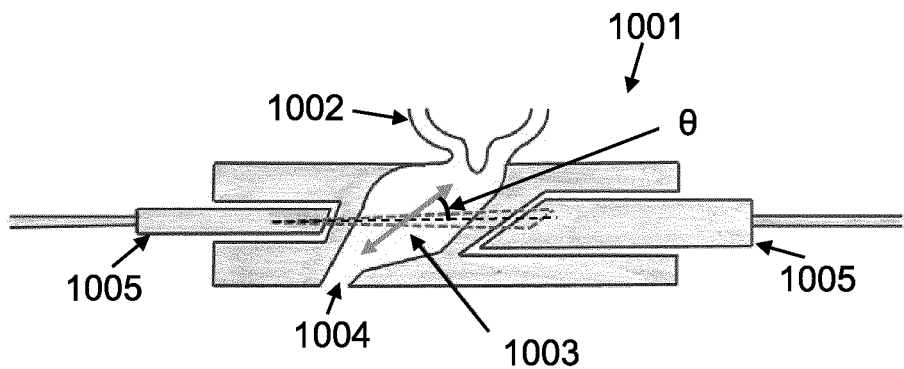
FIGS. 10A and 10B show schematically and exemplarily two embodiments of a nasal cannula with patch cable connector(s)
Figure 10B:
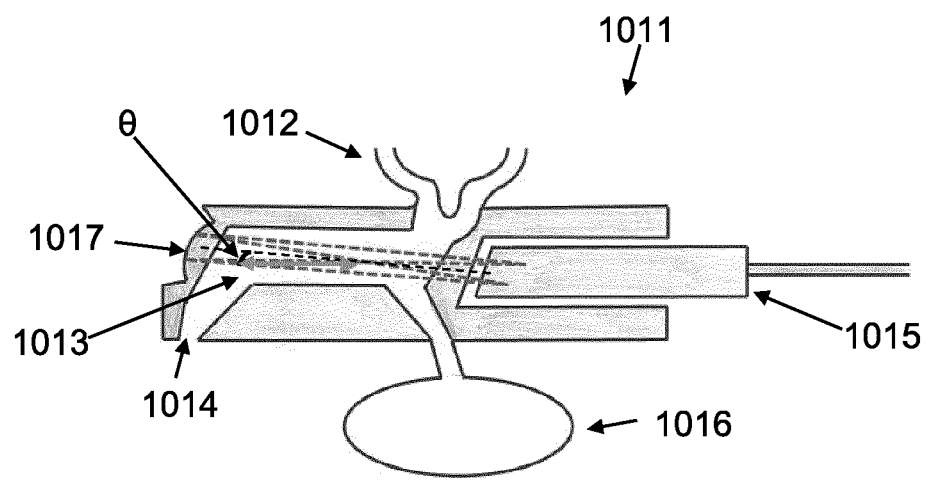

FIGS. 10A and 10B show nasal cannula configurations with patch cable connector(s). These oral-nasal cannula configurations are suitable for diode laser capnography and enable the recording of accurate capnography waveforms by taking care that the $CO_2$ concentration in the cannula equals the concentration in the respiratory air during the complete breathing cycle.

More specifically, a cross section of a nasal cannula 1001 according to this invention is shown in FIG. 10A. During exhalation part of the exhaled air passes consecutively through nasal prongs forming an inlet part 1002, a gas sensing cavity 1003 and an outlet part with a restriction 1004. During inhalation the air passes the cannula in the reverse direction. The flow path is smooth so no significant vortices occur during respiration and there is a uniform distribution of the $CO_2$ in the gas sensing volume. At the two sides of the cannula, receptacles are present for patch cable connectors 1005. One patch cable connector incorporates a light guide and its exit face, a lens to focus the light and an exit window. The light beam passes the gas sensing cavity walls and the cavity. The other patch cable connector incorporates a window and a photo detector to detect the transmitted light. The cavity walls have a coating on their inside to prevent scattering and light absorption by water droplets. The angle θ between the average flow direction and the direction of the optical beam in this embodiment is around 45° to increase the absorption length while keeping the overall volume small. The cannula is preferably injection molded from a plastic material that is transparent at the absorption wavelength of $CO_2$. Polycarbonate can be used for this purpose. The inlet and outlet parts can be separate parts made of a different material than the cannula part with the gas sensing cavity. The inlet part with nasal prongs and the outlet part can be made of a soft material for instance silicone and during manufacturing shifted over or clicked onto the central part.

FIG. 10B shows a cross section of a cannula 1011 that is suitable for breathing through the nose as well as breathing through the mouth. During exhalation part of the exhaled air passes consecutively through nasal prongs forming an inlet part 1012 and/or an oral cap forming another inlet part 1016, a gas sensing cavity 1013 and an outlet part with a restriction

1014. In this design, the angle θ between the average flow direction in the gas sensing cavity 1013 and the beam direction is close to 10° to provide a long absorption path. The beam is reflected by a curved mirror 1017 on one side of the cannula and passes the gas-sensing cavity twice thereby doubling the absorption length. A patch cable connector 1015 incorporates a window, a fiber and its exit face and a photo detector. No lens is present in the connector in this case. The divergent beam from the fiber is collimated by the mirror that is part of the injection molded cannula. After molding a reflective metal layer can be deposited on the curved mirror surface. The flow direction in the gas sensing cavity is the same during respiration through the mouth and through the nose. Because the outlet part 1014 is situated away from the nose and mouth, during inhalation the air in the gas sensing cavity is replaced by environmental air with a low $CO_2$ concentration and a capnogram with a close to zero level is obtained during inhalation.

Both configurations require an angle between respiratory flow and optical beam direction that is smaller than 90 degrees. The cannula has to include both an inlet part that effectively samples the nasal or oral flow and an outlet part that limits exchange of carbon dioxide $CO_2$ by diffusion. The flow resistance of the central gas sensing cavity being small compared to the inlet and outlet part, said cavity has a larger cross section in the flow direction. In the case of a cannula that is suitable for respiration through the nose as well as through the mouth, the flow path has the same flow direction through the gas sensing cavity for nasal as well as oral breathing and an outlet part that is away from the nose and mouth.

According to another embodiment in accordance with the invention, a breathing adapter receptacle having an receptacle insert is provided. The receptacle insert is in the form of a gel or flexible rubber at the interface between the adapter connector of the patch cable and the breathing adapter. This gel or flexible rubber makes contact with the adapter connector window after insertion and has an index of refraction that is close to index of refraction of the front window of the adapter connector and also close to the refractive index of a possible fingerprint.

Figure 11:
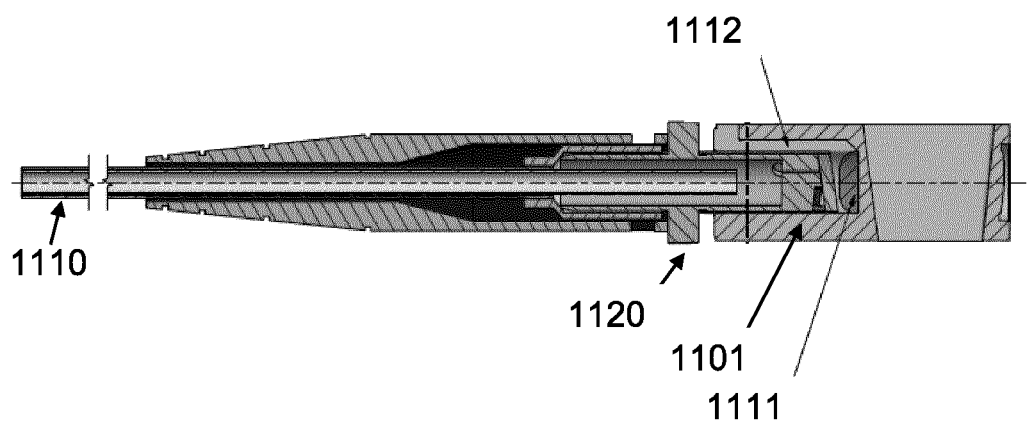
FIG. 11 shows schematically and exemplarily an embodiment of a breathing adapter having a connector receptacle insert.

FIG. 11 shows an embodiment with a gel. A droplet of a high viscosity gel (1111) is placed within the cannula receptacle (1101) during manufacturing. Subsequently, the cannula/airway adapter is packaged so the optical interfaces remain free of dust. Before use, the cannula is unpacked and the patch cable plug (1120) inserted and fixed in the cannula receptacle (1101). During insertion, the window at the front part of the plug is pushed into the gel (1111) so a direct contact between window and gel is established. Abundant gel (1111) is pushed into the overflow channel (1112). The gel has a small absorption at 2 µm wavelength and an index of refraction around 1.5 to be close to the index of refractions of silica, window epoxy/glass and the for instance polycarbonate of the inner part of the cannula. Various polydimethylsiloxane PDMS silicone compositions fulfil these requirements. Alternatively, gelated colloidal silica with sufficient small particle size can be used or a mixture of the colloidal silica and silicone.

Alternatively, the receptacle insert is a flexible rubber. For example, PDMS silicone can be prepared with various cross-linking densities. In this way the silicone can be made into a flexible rubber material suitable as adaption insert. By injection molding an adaption insert is made with the appropriate dimensions and during cannula assembly placed within the cannula receptacle. The flexibility of the silicone and dimensions of the adaption insert is adjusted in such a way that after insertion of the plug into the receptacle a direct contact is established between the connector-plug window and adaption insert. A small expansion volume can be present within the cannula along the circumference of the receptacle to allow for the expansion during insertion. Application of a porous flexible silicone rubber allows the silicone to be soaked with a fluid. Preferably the fluid has a low volatility so it remains within the adaption insert during storage of the cannula. When the connection between patch cable and cannula is established, the fluid is pushed against the connector plug window and an interface without air layer is formed.

Another alternative is a diffusive receptacle insert. Light scattering particles are incorporated within the silicone rubber for instance silica particles with a size comparable or somewhat larger than the wavelength. When the optical beam traverses the adaption insert made of such a material, it acts as a diffuser and the coherence of the laser beam is reduced. The advantage of a diffusive receptacle insert is that interference of the laser-light on the gas sensing cavity walls and by that spectral background in the absorption signal is reduced leading to an improvement of the quality of the capnography signal.

As already discussed above with respect, for instance, to FIG. 4 the light unit and the processing unit, for instance, the detection electronics, can also be part of the module connector 913 instead of being part of the respiratory module 903. In this case the respiratory module 903 only provides an electric interface to the module connector 913 at which power for the light providing unit and the processing unit can be provided, and further a data interface, at which a data signal indicative of the concentration of the respiratory gas can be provided from the module connector 913 to the respiratory module 903.

Although in the above embodiments the patch cable, breathing adapter, and respiratory module where adapted to detect $CO_2$ as respiratory gas, in other embodiments the patch cable, breathing adapter, and respiratory module, in particular the optical light guide and the light source can be adapted to detect other respiratory gases, like $O_2$ or a volatile anesthetic agent.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Procedures like the determination of the concentration of a respiratory gas based on a signal provided by the light detector performed by one or several unit or devices can be performed by any other number of units or devices. For instance, these procedures can be carried out by a single device. These procedures can in particular be implemented as program code means of a computer program and/or as dedicated hardware.

Any reference signs in the claims should not be construed as limiting the scope.

The invention refers to a patch cable for connecting a respiratory module to a breathing adapter being, e.g., part of a capnography system. The patch cable comprises a) a module connector, b) an adapter connector comprising a light detector, c) a light guide, and d) an electric cable for directing an electric detection signal generated by the light detector from the adapter connector to the module connector. The adapter connector is configured such that an end of the light guide is positioned to provide the light into a gas cavity of the breathing adapter. The adapter connector is adapted such that the light detector detects light provided by the end of the light guide that has interacted with the gas provided in the gas cavity, when the adapter connector is connected to the breathing adapter. This, allows to improve the accuracy of respiratory gas detection.

The invention claimed is:

1. A patch cable for connecting a respiratory module to a breathing adapter, wherein the breathing adapter comprises a gas cavity, and wherein the breathing adapter and the gas cavity are adapted such that respiratory gas from a patient can enter the gas cavity when the breathing adapter is placed in functional contact with the mouth and/or nose of the patient, wherein the respiratory module is adapted to process data indicative for a concentration of a respiratory gas based on a signal provided through the patch cable, wherein the patch cable comprises:
   a module connector configured to connect a first end of the patch cable to the respiratory module,
   an adapter connector configured to connect a second end of the patch cable to the breathing adapter, wherein the adapter connector comprises a light detector,
   a light guide configured to guide light from the module connector to the adapter connector, wherein the adapter connector is configured such that an end of the light guide is positioned to provide the light into the gas cavity of the breathing adapter, when the adapter connector is connected to the breathing adapter, wherein
      the adapter connector is configured such that a surface of the light detector, at which the light is detected, is positioned at an angle with respect to a first beam direction of the light detected by the light detector, wherein the first beam direction of the light detected by the light detector is a spatial average beam direction of all light beams falling on the light detector and wherein the angle between the detecting surface of the light detector and the beam direction is the angle between the first beam direction and a normal to the detecting surface, and/or
      the surface at the end of the light guide is at an angle with respect to a second beam direction of the light provided by the end of the light guide into the gas cavity, when the adapter connector is connected to the breathing adapter, wherein the second beam direction of the light provided by the end of the light guide is a spatial average beam direction of all light beams provided by the end of the light guide and wherein the angle between the surface at the end of the light guide and the second beam direction is the angle between the second beam direction and a normal of the surface, and
   an electric cable configured to direct an electric detection signal generated by the light detector from the adapter connector to the module connector, wherein the adapter connector is adapted such that the light detector detects light provided by the end of the light guide that has interacted with the gas provided in the gas cavity, when the adapter connector is connected to the breathing adapter, such that the detection signal generated by the light detector is indicative of the concentration of a respiratory gas provided in the gas cavity.

2. The patch cable according to claim 1, wherein the adapter connector comprises a first connector part and a second connector part, wherein the first connector part comprises the light detector and the second connector part comprises the end of the light guide, wherein the first connector part and the second connector part are adapted to connect the adapter connector to the breathing adapter such that light provided through the end of the light guide and having passed through the gas cavity of the breathing adapter is detected by the light detector when the adapter connector is connected to the breathing adapter.

3. The patch cable according to claim 1, wherein the adapter connector comprises a U-shape, wherein the end of the light guide is positioned on one side of the U-shaped adapter connector and the light detector is positioned at the other side of the U-shaped adapter connector such that light provided through the end of the light guide and having passed through the gas cavity of the breathing adapter is detected by the light detector when the adapter connector is connected to the breathing adapter.

4. The patch cable according to claim 1, wherein the breathing adapter provides at least one reflector as part of the breathing adapter on a side of the gas cavity opposite to a connection side at which the adapter connector is connectable to the breathing adapter, and wherein the adapter connector is adapted such that the end of the light guide and the light detector face substantially in the same direction such that light provided by the end of the light guide into the gas cavity and reflected by the at least one reflector provided as part of the breathing adapter is detected by the light detector when the adapter connector is connected to the breathing adapter.

5. The patch cable according to claim 1, wherein the end of the light guide comprises a lens incorporated within the adapter connector.

6. The patch cable according to claim 1, wherein the adapter connector further comprises a front part formed from a transparent material and being positioned between the end of the light guide and/or in front of the light detector and the gas cavity when the adapter connector is connected to the breathing adapter.

7. The patch cable according to claim 1, wherein the module connector further comprises:
   a light providing unit being adapted to provide light through the light guide, and
   a processing unit being adapted to receive the electrical detection signal provided by the light detector, wherein the processing unit is adapted to generate a data signal representing the respiratory gas concentration based on the electric detection signal.

8. The patch cable, according to claim 1, further comprising the breathing adapter being adapted to be connected to the adapter connector of a patch cable according to claim 1, wherein the breathing adapter comprises a gas cavity, wherein the breathing adapter and the gas cavity are adapted such that respiratory gas from the patient can enter the gas cavity, when the breathing adapter is in functional contact with the patient, and wherein the breathing adapter is further adapted to connect to the adapter connector such that light provided by the end of the light guide can be detected by the light detector of the adapter connector after having passed the gas cavity for interacting with the respiratory gas provided in the gas cavity.

9. The patch cable according to claim 8, wherein surfaces of the gas cavity comprise an angle with respect to a beam direction of a light beam provided through the end of the light guide when the adapter connector is connected to the breathing adapter.

10. The patch cable according to claim 8, wherein the breathing adapter comprises at least one reflector being positioned such that the light provided by the end of the light guide is reflected by the at least one reflector such that it is detected by the light detector after the reflection at the at least one reflector when the adapter connector is connected to the breathing adapter.

11. The patch cable according to claim 8, wherein the breathing adapter includes both an inlet part to sample nasal and/or oral flow and an outlet part to limit exchange of carbon dioxide by diffusion, the gas cavity having a larger cross section in the gas sensing cavity than the inlet part and outlet part.

12. The patch cable according to claim 8, wherein the flow direction within the gas sensing cavity of the breathing adapter has an angle ($\theta$) of less than 90 degree with respect to the optical beam direction.

13. A patch cable according to claim 8, wherein a receptacle insert in the form of a gel or flexible rubber is provided at the interface between an adapter connector of the patch cable and the breathing adapter.

14. A respiratory gas detection system comprising:
a breathing adapter,
a patch cable according to claim 1 connecting the respiratory gas module to the breathing adapter, and
a respiratory module adapted to process data indicative for a concentration of a respiratory gas based on a signal provided through the patch cable.

* * * * *